United States Patent
Rhyu et al.

(10) Patent No.: US 10,116,997 B2
(45) Date of Patent: Oct. 30, 2018

(54) METHOD AND APPARATUS FOR TRANSMITTING/RECEIVING CONTENT IN A BROADCAST SYSTEM

(75) Inventors: Sung-Ryeul Rhyu, Yongin-si (KR); Jae-Yeon Song, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 6 days.

(21) Appl. No.: 13/980,236

(22) PCT Filed: Jan. 18, 2012

(86) PCT No.: PCT/KR2012/000453
§ 371 (c)(1),
(2), (4) Date: Jul. 17, 2013

(87) PCT Pub. No.: WO2012/099403
PCT Pub. Date: Jul. 26, 2012

(65) Prior Publication Data
US 2013/0298177 A1 Nov. 7, 2013

(30) Foreign Application Priority Data
Jan. 18, 2011 (KR) .................. 10-2011-0005174
Jan. 19, 2011 (KR) .................. 10-2011-0005640

(51) Int. Cl.
*H04N 21/643* (2011.01)
*H04N 21/234* (2011.01)
(Continued)

(52) U.S. Cl.
CPC .......... *H04N 21/643* (2013.01); *H04N 21/23* (2013.01); *H04N 21/234* (2013.01); *H04N 21/235* (2013.01); *H04N 21/236* (2013.01); *H04N 21/2343* (2013.01); *H04N 21/2358* (2013.01); *H04N 21/2365* (2013.01); *H04N 21/23424* (2013.01); *H04N 21/23439* (2013.01);
(Continued)

(58) Field of Classification Search
None
See application file for complete search history.

(56) References Cited

U.S. PATENT DOCUMENTS 5,004,225 A * 4/1991 Krukovsky ............ A63G 31/16
                                                                472/131
8,149,530 B1 * 4/2012 Lockton .................. A63F 13/12
                                                                 360/65
(Continued)

FOREIGN PATENT DOCUMENTS

KR  10-2003-0059152 A  7/2003
KR  10-2006-0114080 A  11/2006
KR  10-2007-0078238 A  7/2007

OTHER PUBLICATIONS

Song et al., "Response to Call for Proposals for MPEG Media Transport", ISO/IEC JTC1/SC29/WG11, Jan. 2011, Daegu, Korea.

*Primary Examiner* — Justin E Shepard
(74) *Attorney, Agent, or Firm* — Jefferson IP Law, LLP (57) ABSTRACT

A method and an apparatus for transmitting content in a content-transmission system are provided. The apparatus includes a service provider to construct a service using a plurality of pieces of content, and to transmit the service via one or more paths over a heterogeneous network, such that the service may be consumed in a converged environment.

32 Claims, 9 Drawing Sheets

(51) Int. Cl.
  *H04N 21/431* (2011.01)
  *H04N 21/43* (2011.01)
  *H04N 21/2343* (2011.01)
  *H04N 21/23* (2011.01)
  *H04N 21/235* (2011.01)
  *H04N 21/41* (2011.01)
  *H04N 21/40* (2011.01)
  *H04N 21/435* (2011.01)
  *H04N 21/236* (2011.01)
  *H04N 21/2365* (2011.01)
  *H04N 21/242* (2011.01)
  *H04N 19/61* (2014.01)

(52) U.S. Cl.
  CPC ... *H04N 21/234381* (2013.01); *H04N 21/242* (2013.01); *H04N 21/40* (2013.01); *H04N 21/4122* (2013.01); *H04N 21/43* (2013.01); *H04N 21/4307* (2013.01); *H04N 21/4312* (2013.01); *H04N 21/4316* (2013.01); *H04N 21/4358* (2013.01); *H04N 19/61* (2014.11)

(56) References Cited

U.S. PATENT DOCUMENTS

| | | | |
|---|---|---|---|
| 2003/0093800 A1* | 5/2003 | Demas et al. | 725/90 |
| 2004/0221307 A1 | 11/2004 | Arai et al. | |
| 2005/0010638 A1* | 1/2005 | Richardson | H04L 12/185 709/204 |
| 2005/0027677 A1* | 2/2005 | Hoche | G06F 17/30017 |
| 2005/0259973 A1* | 11/2005 | Yamamoto | H04N 5/772 386/217 |
| 2005/0265321 A1 | 12/2005 | Rappaport et al. | |
| 2006/0177200 A1* | 8/2006 | Deutmeyer et al. | 386/98 |
| 2008/0270913 A1* | 10/2008 | Singer et al. | 715/748 |
| 2009/0260045 A1* | 10/2009 | Karlsson et al. | 725/93 |
| 2009/0264138 A1 | 10/2009 | Kang et al. | |
| 2010/0262492 A1* | 10/2010 | Bogestam | G06Q 30/0255 705/14.53 |
| 2011/0038614 A1* | 2/2011 | Chen et al. | 386/341 |
| 2011/0099579 A1* | 4/2011 | Kim et al. | 725/44 |
| 2011/0255558 A1* | 10/2011 | Hwang et al. | 370/474 |
| 2012/0079541 A1* | 3/2012 | Pan | H04N 21/4302 725/62 |

\* cited by examiner

METHOD AND APPARATUS FOR TRANSMITTING/RECEIVING CONTENT IN A BROADCAST SYSTEM

CROSS-REFERENCE TO RELATED APPLICATION(S)

This application is a National Stage application under 35 U.S.C. § 371 of an International application filed on Jan. 18, 2012 and assigned application No. PCT/KR2012/000453, and claims the benefit under 35 U.S.C. § 365(b) of Korean patent applications filed on Jan. 18, 2011 and Jan. 19, 2011 in the Korean Intellectual Property Office and assigned Serial No. 10-2011-0005174 and 10-2011-0005640 respectively, the entire disclosure of each of which is hereby incorporated by reference.

TECHNICAL FIELD

The present disclosure relates to a method and an apparatus for transmitting/receiving contents in a broadcasting system. More particularly, the present disclosure relates to an apparatus and a method for transmitting/receiving contents through heterogeneous networks in a broadcasting system supporting a multimedia service based on an Internet Protocol (IP).

BACKGROUND

In a broadcasting system, a content service provider desires to provide more information to the screen of a broadcast recipient (i.e., a user). However, when providing more information to a user's screen, such as more information in a frequently viewed news screen, a space occupied by an anchor's face may become small due to display of information such as stock information, a news title, and the like.

As technology has progressed, a broadcasting and communication environment that provides such a service has gradually become more complicated. Moreover, as technologies are advancing and being combined consumers simultaneously consume a plurality of contents in a convergence environment. For example, consumers can enter a search word in a tablet to search for results corresponding to the word and get a result thereof while watching TV. In addition, with increases in a receiver's capability, devices are now available that can access a plurality of heterogeneous communication networks at home or while in transit through a combination of broadcasting and communication technologies as well as large size and high definition displays.

Accordingly, there exists a need for an improved apparatus and method of flexibly providing services to consumers in various environments.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method in which a service provider configures a service by using a plurality of contents and transmits the configured service through one or a plurality of paths on heterogeneous networks.

Another aspect of the present disclosure is to provide an apparatus and a method which can consume a service by using a plurality of contents in a convergence environment.

In accordance with an aspect of the present disclosure, a method of transmitting contents through heterogeneous networks in a broadcasting system supporting a multimedia service based on IP is provided. The method includes generating at least one package including a Moving Picture Experts Group (MPEG) Media Transport (MMT) item, and providing the at least one package to a terminal, wherein the MMT item includes MMT assets and composition information on the MMT assets.

In accordance with another aspect of the present disclosure, an apparatus for transmitting contents through heterogeneous networks in a broadcasting system supporting a multimedia service based on IP is provided. The apparatus includes a package generator configured to generate at least one package including an MMT item, and a transport unit configured to transmit the at least one package to a terminal, wherein the MMT item includes MMT assets and composition information on the MMT assets.

In accordance with another aspect of the present disclosure, a method of receiving contents through heterogeneous networks in a broadcasting system supporting a multimedia service based on IP is provided. The method includes receiving at least one package including an MMT item, analyzing the package, and processing the MMT item included in the package and an MMT asset according to a result of the analysis, wherein the MMT item includes MMT assets and composition information on the MMT assets.

In accordance with another aspect of the present disclosure, an apparatus for receiving contents through heterogeneous networks in a broadcasting system supporting a multimedia service based on IP is provided. The apparatus includes a receiver configured to receive at least one package including an MMT item, a package parser configured to parse the package, and a processor configured to process the MMT item included in the package and an MMT asset according to a result of the analysis, wherein the MMT item includes MMT assets and composition information on the MMT assets.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description take in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following descriptions and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A Moving Picture Experts Group (MPEG) Media Transport (MMT) standard has been proposed by the Moving Picture Expert Group to overcome limitations of Moving Picture Expert Group-2 Transport Stream (MPEG-2 TS) that performs unidirectional communication, is inefficient in transport due to a constant frame size, and generates unnecessary overhead in transport using a transport protocol and an Internet Protocol (IP) specified for audio/video. For example, the MMT standard may be applied to efficiently transmit a plurality of contents through heterogeneous networks. Here, the plurality of contents refers to a set of contents having multimedia elements of video/audio/application. Further, the heterogeneous networks refer to networks where a broadcasting network, a communication network, and the like coexist.

In addition, the MMT standard aims to define an IP-friendly transport technology that is a basic technology in a transport network for a multimedia service.

Accordingly, the MMT standard, which representatively provides an efficient MPEG transport technology in a multimedia service environment changed based on an IP, has been continuously researched and standardized. More particularly, the MMT standard requires a method of providing an efficient MPEG transport technology in a current multimedia service environment which desires to provide a hybrid network (or heterogeneous networks) and a hybrid content.

Accordingly, when a service provider configures a service by using a plurality of contents and transmits the configured service through one or a plurality of paths on heterogeneous networks, the present disclosure allows the service to be consumed in a convergence environment.

Figure 1:
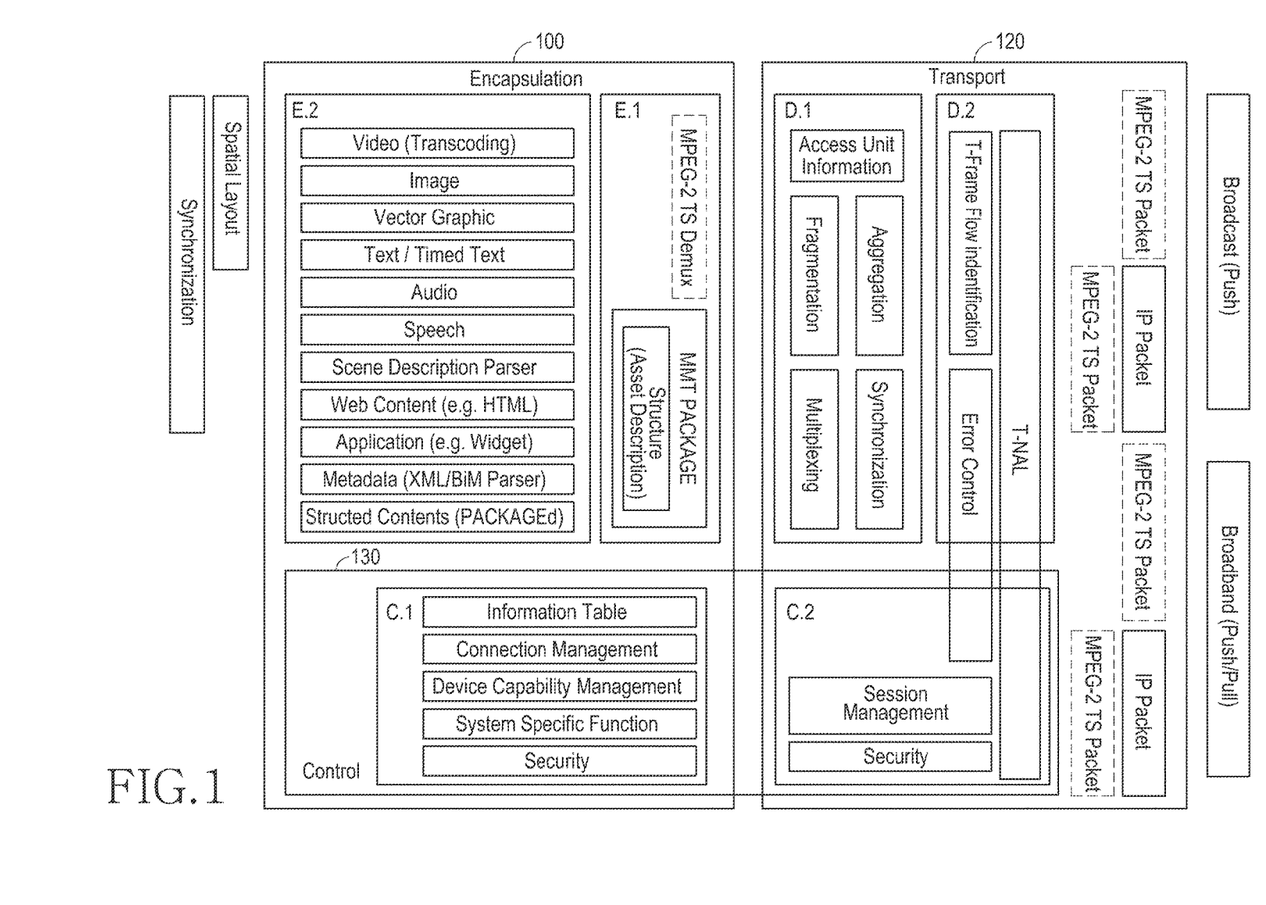
FIG. 1 is a block diagram illustrating a transport system architecture based on a Moving Picture Experts Group (MPEG) Media Transport (MMT) according to an embodiment of the present disclosure.

FIG. 1 is a block diagram illustrating a transport system architecture based on the MMT according to an embodiment of the present disclosure.

Referring to FIG. 1, the MMT standard divides a transport system environment into Encapsulation 100, Delivery 120, and Control 130 to assign roles and provides them with a cooperative relation.

An encapsulation layer (hereinafter, referred to as a "layer E") generates MMT items by using MMT assets. The MMT assets include elements such as video, audio, web contents, applications, and the like. Each of the MMT assets may be independent contents for user consumption. The layer E has two sub layers. A second sub layer E.2 generates MMT assets and provides composition information on the MMT assets. Sub layer E.2 communicates with control layers to provide MMT asset information. A first sub layer E.1 generates an MMT package that is stored and used to deliver MMT items consumed by the user. The MMT package can deliver a live type of the MMT items, a file type of the MMT items, and a hybrid type of the MMT items. Sub layer E.1 also provides associated information on the MMT assets in the package. The layer E communicates with a layer C and a layer D to deliver the MMT package.

A delivery layer (hereinafter, referred to as a "layer D") should deliver the MMT package and data received from the layer C to a receiver side. The layer D uses an Access Unit (AU) for efficient delivery. Since the MMT items (or package) may have different QoS characteristics, they may have different types of AUs. A layer T also includes two sub layers. Sub layer D.1 generates the AU based on package characteristics and data from the layer C and communicates with the layer C and the layer D for QoS. Sub layer D.2 generates a D frame, provides a functionality of a flow control, and provides information on a D-Frame which can be used by network nodes for QoS guarantee.

A control layer (hereinafter, referred to as a "layer C") manages all functions required for consuming the MMT assets and MMT items. A layer C.1 provides functions of MMT item information and consumption related information, manages a connection of the MMT package, and manages a device capability such as states of a codec and a memory. A layer C.2 should transmit data generated in the layer C for the MMT D Frame and manage a session.

The Encapsulation 100 stereotypes a service which a service provider desires to provide (that is, embodies or encapsulates the service).

The Delivery 120 transmits contents with quality required for the service when an available path between the service provider and a consumer is selected.

The Control 130 displays lists of currently available services to initiate the service and an available path through which a container and contents of the corresponding service can be provided.

Figure 2:
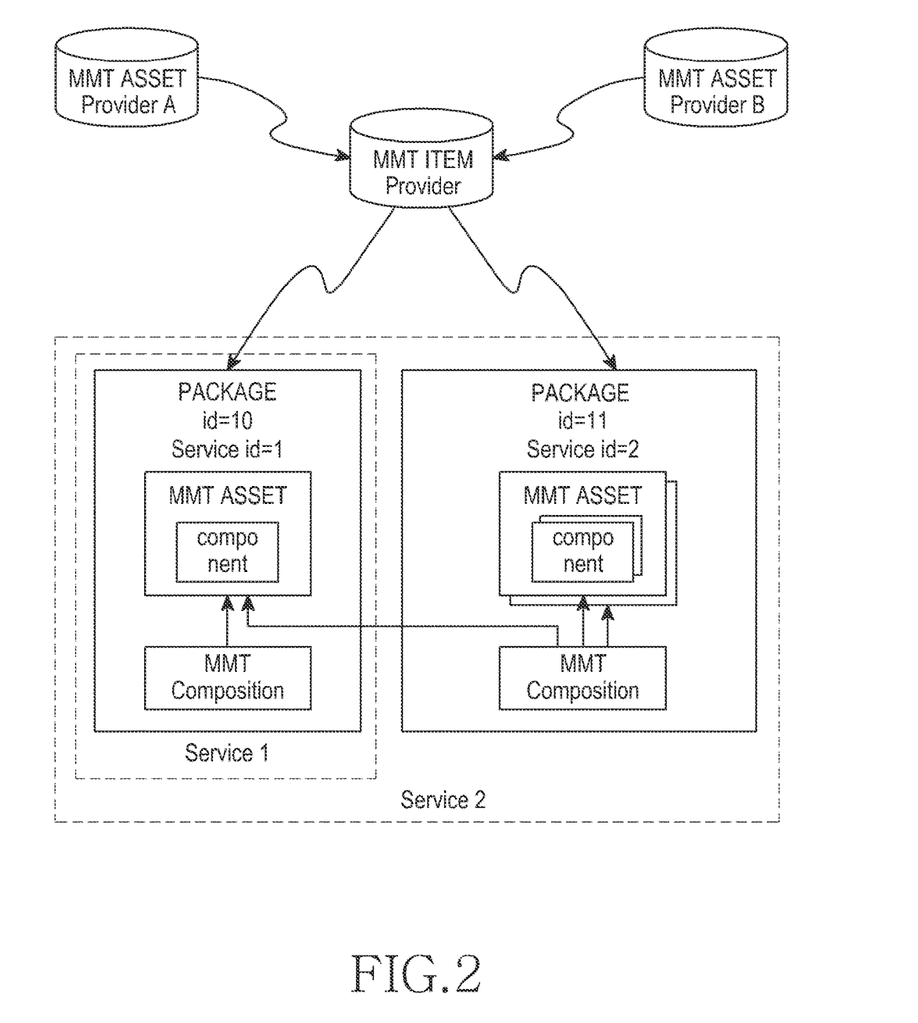
FIG. 2 is a diagram illustrating configurations of an MMT item, an MMT asset, and a package according to an embodiment of the present disclosure.

FIG. 2 is a diagram illustrating configurations of an MMT item, an MMT asset, and a package according to an embodiment of the present disclosure.

Referring to FIG. 2, MMT Encapsulations include the MMT item, the MMT asset, the package, and a slice. The MMT item is a service which the service provider desires to provide and indicates a minimum unit which the consumer can purchase. The MMT item includes the MMT assets and composition information on the MMT assets.

The MMT asset is a component of the MMT item and indicates a minimum unit which can be consumed. For example, the MMT asset includes MPEG-2 TS, MPEG-2 Program Stream (MPEG-2 PS), mp4, mp21, MPEG-U Widget, Application, Image, Dynamic Adaptive Streaming over HTTP (DASH) and the like. Further, the MMT asset may be provided from different MMT asset providers.

The package encapsulates the MMT assets. The MMT item is inserted into one or a plurality of packages and then transmitted.

The slice indicates one or a plurality of fragments cut from the MMT asset.

The package may include one or a plurality of MMT assets. The package includes an MMT asset list, transport characteristics of each MMT asset, a detailed description, a slice list, MMT item composition information, and the MMT asset as a payload.

1.1.1 Component

Figure 3:
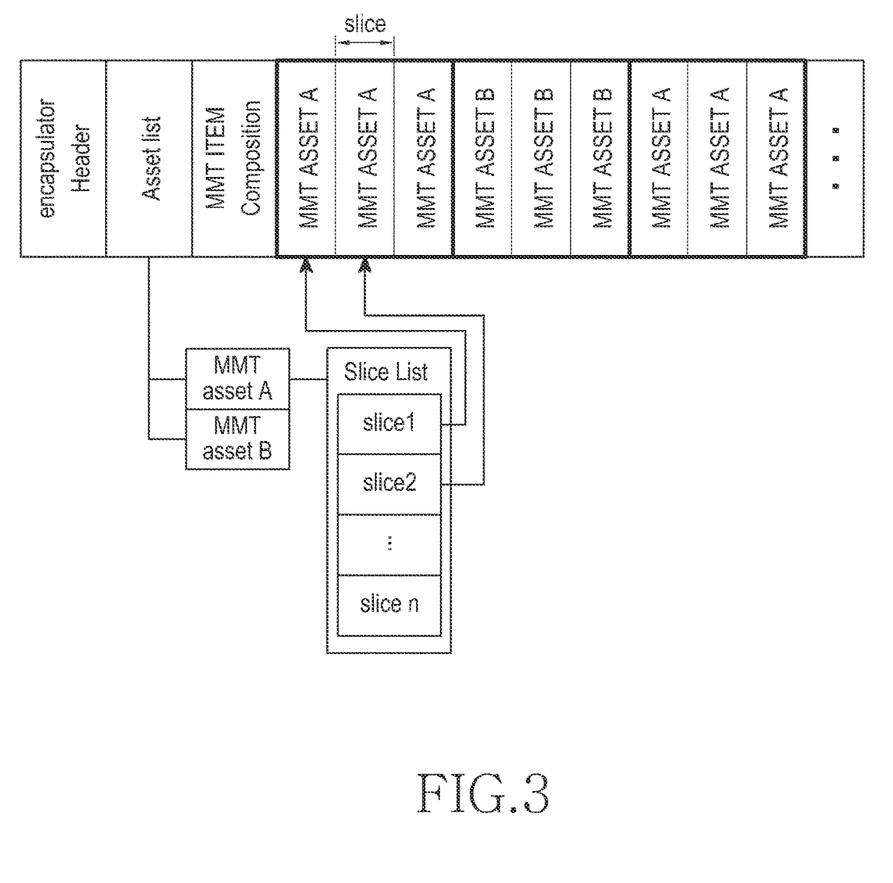
FIG. 3 is a diagram illustrating configurations of a package and a slice list according to an embodiment of the present disclosure.

FIG. 3 is a diagram illustrating configurations of a package and a slice list according to an embodiment of the present disclosure.

Referring to FIG. 3, the package includes MMT asset lists, MMT item composition information, and MMT assets. The MMT asset lists include transport characteristics of each MMT asset, a detailed description, and slice lists.

1.1.1.1 MMT Asset List

The MMT asset list provides lists of MMT assets within one package. The MMT asset list also provides asset lists within another package. The MMT asset list includes an ID of each MMT asset, transport characteristics, a detailed description, and a slice list. The actual MMT asset is stored as a payload of the package.

1.1.1.1.1 Transport Characteristics

Transport characteristics from the viewpoint of the service provider which are recommended to reproduce the MMT asset are displayed. The transport characteristics correspond to requirements for guaranteeing quality in the transport. The transport characteristics provide information required to properly transmit and consume the MMT asset. The MMT asset may be completely or loosely synchronized with other MMT assets on a time axis of the MMT item and may then be reproduced. Further, all clients connected with the service provider may be simultaneously reproduced based on a wall clock. Alternatively, the transport should be performed without an error or loss according to a type of MMT asset (widget or program) or may accept the loss (adaptive streaming or frame drop). Finally, the MMT asset may require a unicast or a bidirectional connection. A type of connection includes one-to-one, one-to-n, unidirectional, and bidirectional connections. Further, the transport characteristics include loss disallowance, loss acceptance, a connection relation, and the like.

The requirements from the viewpoint of the service provider are delivered to the MMT-Delivery or MMT-Control and used to map numerical or physical characteristics according to a function provided by each of the requirements.

1.1.1.1.2 Detailed Description

The detailed description provides information required for individually consuming or storing the MMT assets, for example, a filename of the MMT asset, mime-type, and the like. The detailed description is used when the MMT assets are separately stored or consumed. The detailed description may include a property value of the asset as well as contents listing properties of the asset.

1.1.1.1.3 Slice List

Referring to FIG. 3, the MMT asset is stored in the payload in units of slices. The number of slices may be singular or plural, and lengths of the slices may not be the same. When the slices are stored according to characteristics of the MMT asset such as temporal, spatial, and semantic characteristics, the slices can be used for mapping in the Access Unit (AU) in D1. The slice has a relative position on the payload, a length, and a Presentation Time Stamp (PTS) time of the corresponding slice. The slice list provides information regarding the manner in which fragments cut from the MMT asset are distributed on the payload.

1.1.1.2 MMT Asset—Slices Structure

The MMT item is designed to be used for storage and transport. A general structure is basically used for the purpose of the storage. Interleaving is used for the purpose of the transport. A live structure is used for live streaming having limitless lengths.

1.1.1.2.1 General Mode

[header|list|composition][MMT asset A, B, C]

One MMT asset is stored as one slice.

1.1.1.2.2 General+Trick Mode

[header|list|composition][MMT asset A1A2A3 . . . , B1B2B3 . . . , C1C2C3 . . . ]

Referring to FIG. 3, one MMT asset is divided into a plurality of slices and then stored. A time on an individual time axis of the MMT asset may be informed through a Presentation Time Stamp (PTS) of the slice.

The slice is cut and provided in units of seconds or groups of pictures based on the PTS.

1.1.1.2.3 Interleave

[header|list|composition][MMT asset A1B1C1A2B2C2A3B3C3, . . . ]

Referring to FIG. 3, one MMT asset is divided into a plurality of slices and then stored. MMT assets which should be reproduced together are interleaved and then stored.

The slice is cut and provided in units of seconds or groups of pictures based on the PTS. Slices of the MMT asset which express the same time according to an order of time expressed on the time axis of the MMT item are grouped and then provided.

1.1.1.2.4 Live

[header|list|composition][MMT asset A1B1C1][header|list|composition][MMT asset A2B2C2] . . .

A plurality of MMT assets which should be reproduced together are divided into slices in units of proper time and stored.

It is considered that the package transmits only a part of the MMT assets and the package having the same ID among the following packages transmits a back part of the MMT asset. At this time, it is identified whether a sequence number of the previous package and a sequence number of the next package are increased by 1 through an identification of the sequence numbers. When the sequence number is not increased by 1, it means that the package is repeatedly transmitted for a special purpose, so that the package is not used if there is no problem in the transport. However, when the sequence number is increased by 1 or more, the package which should be transmitted in the middle is not received, so that retransmission should be requested or a parameter required for reproducing the package should be reset.

An interval of the package may be controlled according to a transport time and a transport rate in consideration of broadcast transport. When a package is broadcasted, the transport rate is theoretically calculated with a fixed bit rate, and a package size is designated such that the integer number of package headers such as one or more package headers starts at a predetermined time, for example, every 0.7 seconds. At this time, information corresponding to additional information, for example, an MMT asset description, transport characteristics, and MMT item composition information may be omitted in the header of the package in a middle section which does not correspond to every 0.7 seconds. At this time, it is considered that the omitted information is still effective between MMT items having the same package ID.

1.1.1.3 MMT Item Composition Information

Figure 4:
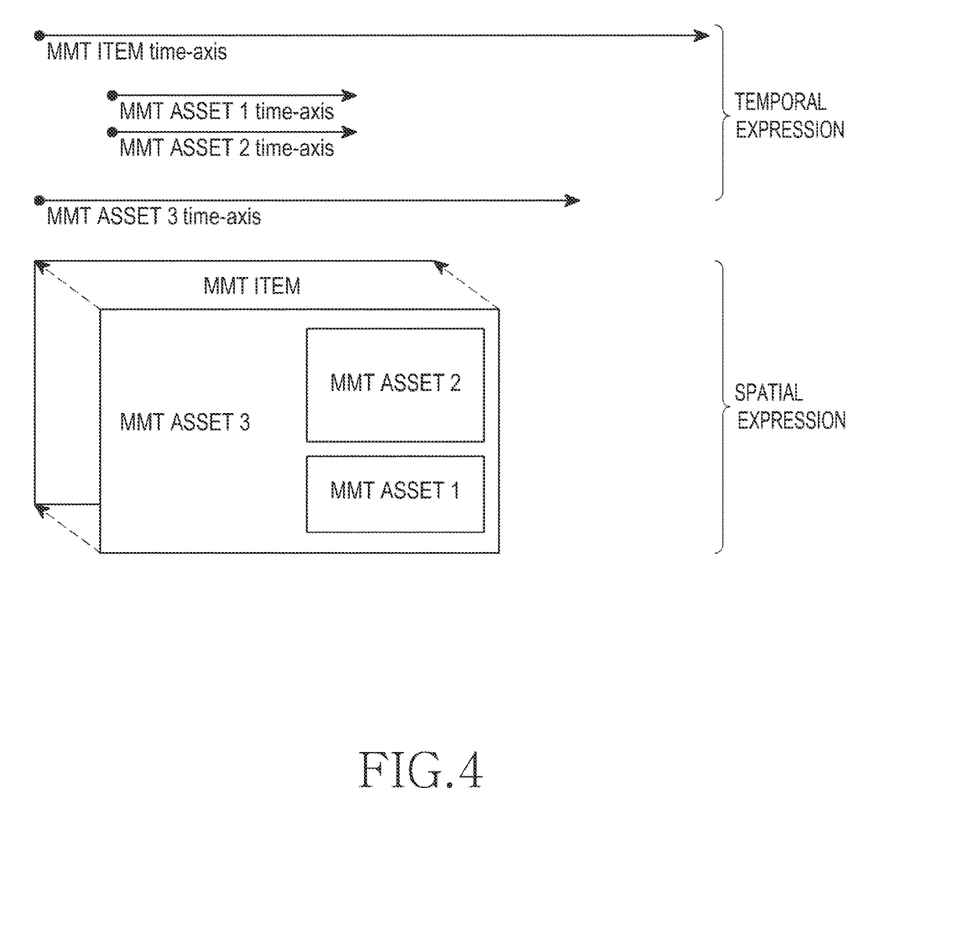
FIG. 4 is a diagram illustrating a configuration of temporal and spatial MMT assets in an MMT item according to an embodiment of the present disclosure.

FIG. 4 is a diagram illustrating a configuration of temporal and spatial MMT assets in an MMT item according to an embodiment of the present disclosure.

Referring to FIG. 4, the MMT item includes MMT assets.

A composition of the MMT item indicates a composition of corresponding/different encapsulation on time and space of the MMT item, a composition of the MMT asset within the encapsulation, and a composition of the MMT asset component within the MMT asset within the encapsulation. The MMT item composition information has an entity as a lower component, and provides information as to how the MMT assets are arranged on the reproduction time and space of the MMT item according to an intention of the service provider through the MMT item composition information and informs of a relation between the MMT assets.

Service composition information of a different package

An MMT asset within the same or different package

A component within the MMT asset within the same or different package

Description of the MMT item composition information.

As shown in FIG. 4, which part of the MMT asset, and when and until when the part is displayed on a reproduction time of the MMT item are described.

As shown in FIG. 4, which part of the MMT asset and where the part is displayed on an expression space of the MMT item are described.

A relation between the MMT assets is displayed.

1.1.1.3.1 Schema 1.1.1.3.2 Semantics

The MMT item composition information is indicated through an xml document by using seq, par, and sel elements. When the MMT item composition information is in a format other than xml, a different method (for example, a field, a box such as ISOFF or the like) which takes on a corresponding role is possible.

The seq element sequentially executes child elements.

The par element simultaneously executes child elements in parallel.

The sel element selects only one child element and executes the selected one child element.

The three elements have a start as a property.

The start corresponds to a time on the time axis of the MMT item when the corresponding element starts.

The three elements have a div as the child element.

The div corresponds to a temporal and spatial place holder of the MMT asset.

The div element has a target_characteristic as a property.

The target_characteristic corresponds to a characteristic required for executing the MMT asset. Even though all of the above described characteristics are not satisfied, a closest reproduction device among available reproduction devices for reproducing the MMT item is recommended to reproduce the MMT item.

A value of the target_characteristic includes Main, 3D, Interactivity, Remote, N-screen, Mvc and the like. However, the value is not limited thereto.

Main: refers to a most main reproduction device.

3D: refers to a device supporting 3-D reproduction.

Mvc: refers to a device supporting MVC reproduction.

N-screen: refers to an N-screen composition device or a plurality of devices participating in the N-screen composition.

Remote: refers to a remote controller.

Interactivity: refers to a device which can receive a user interactive input.

The following relation can be described using the above matters.

Relation 1. An MMT asset A can perform a reproduction only when there is an MMT asset B (i.e., dependent).

The MMT asset B can independently perform a reproduction without the MMT asset A (i.e., independent).

TABLE 1

```
<sel>
   A
   <par>
      A
      B
   </par>
</sel>
```

Relation 2. An MMT asset C, an MMT asset D, and an MMT asset E have a relation in which only one of them is selected on the time axis as shown in Table 2 (i.e., OR).

TABLE 2

```
<sel>
   C
   D
   E
</sel>
```

Relation 3. An MMT asset F, an MMT asset G, and an MMT asset H have a relation in which they are necessarily executed together as shown in Table 3 (i.e., more compulsory AND)

TABLE 3

```
<par>
   F
   G
   H
</par>
```

Which part, in terms of time of the MMT asset, and reproduction location, in terms of time of the MMT item, can be expressed as shown in <example 1> below. A temporal part of the MMT asset uses a URL fragment identifier in <example 1> below.

Example 1

Syntax of Table 4 indicates a case where 100 seconds to 200 seconds of MMT asset 1, or MMT asset 1 and MMT asset 2 are reproduced during 50 seconds of the MMT item time.

TABLE 4

```
<seq start=50s>
   self://asset#identifier=1*time(100s,200s)
```

TABLE 4-continued

```
        <par>
            self://asset#identifier=1*time(100s,200s)
            self://asset#identifier=2*time(100s,200s)
        </par>
    </seq>
```

Which part, in terms of space of the MMT asset, and reproduction location, in terms of space of the MMT item, can be expressed as shown in <example 2> below.

Example 2

The following Syntax indicates a case where (0,0×800, 600) of MMT asset 1 is attached to (100,100×800,600) of the MMT item. (0,0) and (100,100) indicate (x axis, y axis), and (800,600) indicates (width, height).

```
*116<seq>
    <par>
    <div x=100 y=100 width=800 height=600
source="self://asset#identifier=2*time(100s,200s)*rect(0,0,800,600)">
    </par>
</seq>
```

When the MMT item is reproduced in a plurality of devices, which MMT asset is reproduced in which device can be expressed as shown in <example 3> below.

Example 3

The following Syntax indicates a case where MMT asset 1 is displayed in a main device and MMT asset 2 is displayed in a second device.

```
target_characteristics = main, 3d, interactivity, remote, n-screen, mvc...
<seq>
<par>
    <div target_characteristics="main"
        source="self://asset#identifier=1">
<div target_characteristics="interactivity | remote"
source="self://asset#identifier=2">
</par>
</seq>
```

As shown in the above Syntax, asset 1 is displayed in the main device (for example, a TV screen) and asset 2 is displayed in the second device (that is, a webpage of a mobile phone) for the user.

1.1.2 Syntax
The Syntax is as shown in Table 5.

TABLE 5

| Syntax | No. of bits |
|---|---|
| encapsulator( ) { |  |
|   encapsulator_id | 16b |
|   mmt_item_id | 16b |
|   length_of_encapsulator | 64b |
|   qoe_requirement | 8b |
|   sequence_indicator | 1b |
|   timestamp_indicator | 1b |
|   qoe_requirement_indicator | 1b |
|   mmt_asset_description_indicator | 1b |
|   mmt_item_composition_indicator | 1b |
|   reserved1 | 3b |
|   if(sequence_indicator == '1') { |  |
|     sequence_number | 8b |

TABLE 5-continued

| Syntax | No. of bits |
|---|---|
|   } |  |
|   if(timestamp_indicator == '1') { |  |
|     timestamp | 32b |
|   } |  |
|   mmt_asset_list( ) { |  |
|     number_of_mmt_asset | 16b |
|     for(i=0 ; I<number_of_mmt_asset ; i++) |  |
|     { |  |
|       mmt_asset( ) { |  |
|         mmt_asset_id | 16b |
|         if(qoe_requirement_indicator == '1') { |  |
|           qoe_requirement( ) { | 2b |
|             sync_alignment | 1b |
|             client_alignment | 1b |
|             lossless_delivery | 1b |
|             return_channel |  |
|           } |  |
|         } |  |
|         if(mmt_asset_description_indicator == '1') { |  |
|           mmt_asset_description( ) { |  |
|             length_of_mime_type | 16b |
|             mime_type | N * 8b |
|             length_of_file_name | 16b |
|             file_name | N * 8b |
|           } |  |
|         } |  |
|         mmt_asset_slice_list( ) { |  |
|           number_of_slice | 16b |
|           slice_pattern | 8b |
|           for(j=0 ; j<number_of_slice ; j++) |  |
|           { |  |
|             slice( ) { |  |
|               start | 32b |
|               length | 32b |

1.1.3 Semantics
The use of the sequence number: the sequence number is used only in a case of live contents.
   //Numbers of successive containers when live contents are transmitted
   //The use of a time stamp: a container is analyzed (parsed) in a transport time in a case of VoD.
   //A time when the container should be decoded/parsed (Decoding Time Stamps: DTS)
mmt_asset_list( )
   Lists of the MMT asset within the package.
Transport Characteristics
   Transport characteristics of the package and transport characteristics of the MMT asset. Transport characteristics which the corresponding MMT asset should have in units of packages or in units of MMT assets within the package are stated in a higher level. The transport characteristics are mapped in a network path which an MMT item provider can provide in an MMT-C. The transport characteristics are transmitted through a path on the network provided by the MMT-C.
   In order to transmit the MMT asset in various environments, paths which can be provided should not be stated in the MMT asset. Since the paths may vary depending on the environment, stating the paths is meaningless. An actual path is provided by a different layer-C, and contents and a transport environment are separated by writing a hint through which the path can be generated.
   Transport characteristics( ) {
     sync_alignment
     client_alignment
     lossless_delivery
     return_channel
   } sync_alignment
0: play when available (even though transport is performed later than a time for the reproduction, it has only to be received and then reproduced.)
1: loose sync (There is no problem in spite of improper synchronization (subtitle))
2: lip-sync (It feels awkwardly improper if synchronization is not correct (lip-sync))
3: reserved
client_alignment
0: All clients should start on time.
1: Clients may have different start time in spite of a live broadcast.
lossy_delivery
0: There must not be a transport error (for example, widget).
1: Transport error, quality adaptation is possible.
has_interactivity
0: unidirectional, for example, a broadcasting channel
1: bidirectional; There should be a return channel.
mmt_asset_description( )
A mime-type and a filename are provided in case the MMT asset is stored or the MMT assets are individually consumed.
mmt_asset_slice_list( )
Lists of the slices divided from the MMT asset
slice_pattern
A value is determined according to whether the slices are in a general layout, and in consideration of a trick mode, live transport, and file transmission.
slice( )
This is a fragment cut from the MMT asset. In the live transport, the slice is configured in the access unit such as MPEG-2, MPEG-4 or the like.
mmt_item_composition( )
Composition information of the MMT asset
xml( )

Figure 5:
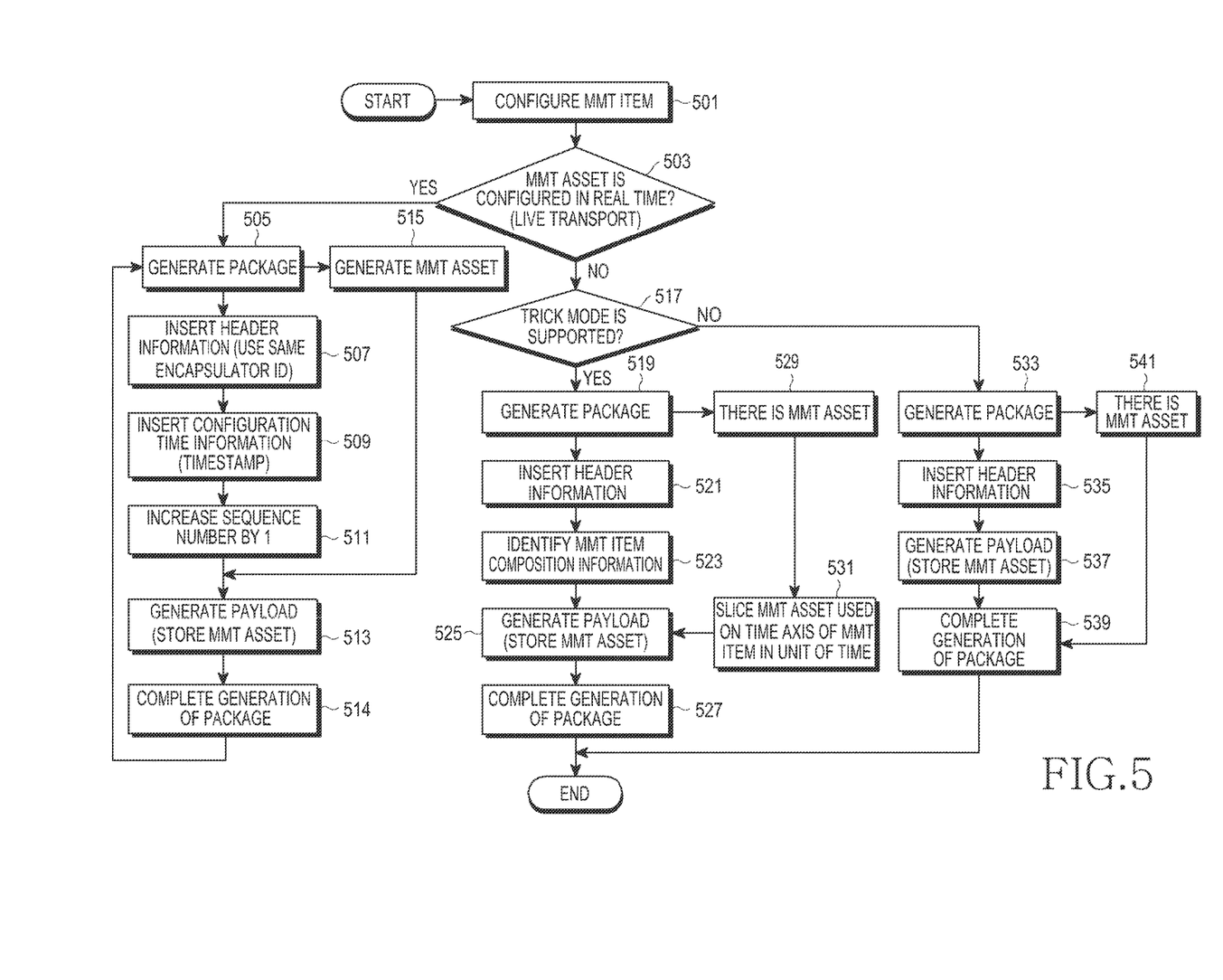
FIG. 5 is a block diagram illustrating a service provider according to an embodiment of the present disclosure.

FIG. 5 is a flowchart illustrating an operation of a service provider according to an embodiment of the present disclosure.

The operation in FIG. 5 is performed by the service provider of FIG. 6 which is described below. However, the service provider is not limited to the service provider of FIG. 6.

Referring to FIG. 5, the service provider receives an MMT asset from an MMT asset provider and composes an MMT item to be sold by using the MMT asset at operation 501. When the MMT asset is directly provided, there is no method of describing how to configure the MMT item. Accordingly, MMT item composition information that describes how the MMT assets are configured within the MMT item should be provided.

It is preferable that the MMT item composition information is provided together with the MMT asset, and accordingly, components included in the MMT item are loaded and provided by using a header-payload structure corresponding to the package.

The package is configured by the service provider to form the MMT item, and a plurality of packages may be used to form one MMT item.

The packages are distinguished by a package ID, an MMT item ID, and a sequence number. The package has an MMT item ID expressed by the package itself. The package ID distinguishes between different packages. When packages have different package IDs and the same MMT item ID, they are different packages included in the same MMT item. When there are different packages having the same package ID, they are distinguished by the sequence number. There is a method of reducing a size of the package and transmitting the package several times for the above described purpose such as the live broadcast. At this time, the sequence number is used to identify the context and whether there is an omitted package on the way.

The service provider enables the reproduction device to access discovery information and transport information of the MMT item by using the MMT-control and the MMT-Delivery after configuring the MMT item. An initiation of the transmission is made by a request of the reproduction device in a one-to-one relation, and random transporting that expects participation of a random reproduction device is possible in a one-to-n relation or broadcast transmission.

The service provider determines whether the MMT asset is configured in real time at operation 503. That is, the service provider determines whether live transport is possible. When the live transport is possible, the service provider generates the package at operation 505. Thereafter, the service provider inserts header information into the package at operation 507. When the header information is inserted, the same package ID is used. Further, the service provider inserts configuration time information by using a timestamp at operation 509 when the header information is inserted. In addition, the service provider increases a sequence number by 1 to perform the live transport at operation 511 when the header information is inserted. Thereafter, the service provider generates a payload at operation 513. As described above, by generating the payload, the MMT asset is stored. After operation 513, the service provider completes the generation of the package at operation 514.

Simultaneously with the generation of the package at operation 505, the service provider generates the MMT asset at operation 515. Thereafter, the service provider proceeds to operation 513.

Meanwhile, when the MMT asset is not configured in real time at operation 503, the service provider determines whether a trick mode is supported at operation 517. When the trick mode is supported, the service provider generates the package at operation 519. Thereafter, the service provider inserts header information into the package at operation 521.

The service provider identifies MMT item composition information at operation 523. Thereafter, the service provider generates a payload at operation 525. As described above, by generating the payload, the MMT asset is stored.

Simultaneously with the generation of the package at operation 519, the MMT asset exists at operation 529. Thereafter, the service provider slices the MMT asset used on the MMT item time axis in units of time at operation 531 and proceeds to operation 525.

After operation 525, the service provider completes the generation of the package at operation 527.

Meanwhile, when it is determined that the trick mode is not supported at operation 517, the service provider generates the package at operation 533. Thereafter, the service provider inserts header information into the package at operation 535 and generates the payload at operation 537. As described above, by generating the payload, the MMT asset is stored. The service provider completes the generation of the package at operation 539.

Simultaneously with the generation of the package at operation 533, the MMT asset exists at operation 541. Thereafter, the service provider proceeds to operation 539.

Figure 6:
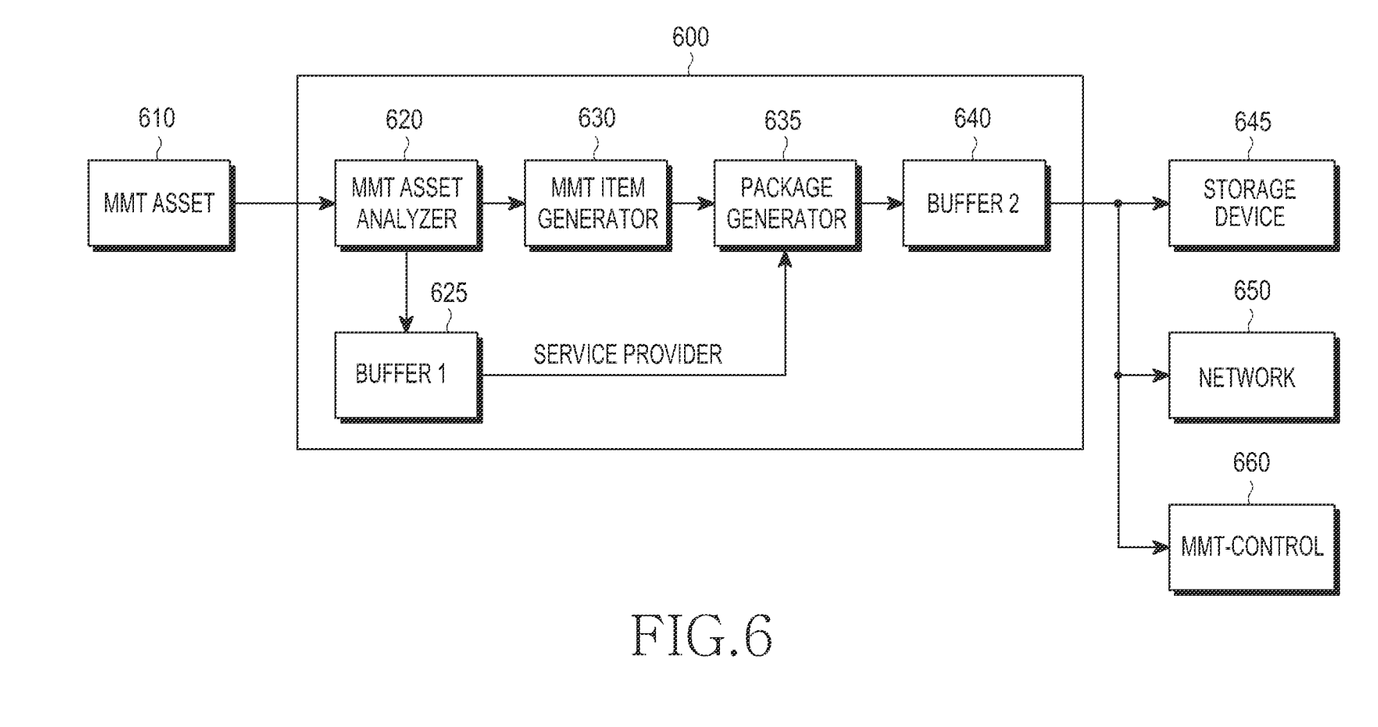
FIG. 6 is a flowchart illustrating an operation of a service provider according to an embodiment of the present disclosure.

FIG. 6 is a block diagram of a service provider according to an embodiment of the present disclosure.

Referring to FIG. 6, the MMT asset 610 is provided to a service provider 600. Then, an MMT asset analyzer 620 within the service provider 600 receives the MMT asset 610 and analyzes the MMT asset 610.

An MMT item generator 630 configures an intended MMT item by reflecting a result of the analysis of the MMT asset analyzer 620. At this time, the MMT item generator 630 transmits the MMT item and information on the MMT item to the package generator 635 in order to use the MMT item as a component and insert the MMT item into the package for the storage.

The package generator 635 receives the MMT asset 610 in a buffer #1 625 and stores the received MMT asset 610 in the package, and stores again the MMT asset 610 in a buffer #2 640. The service provider 600 delivers information on the package to an MMT-Control 660 to a reproduction device through a storage device 645 or a network 650 in order to provide the package.

Figure 7:
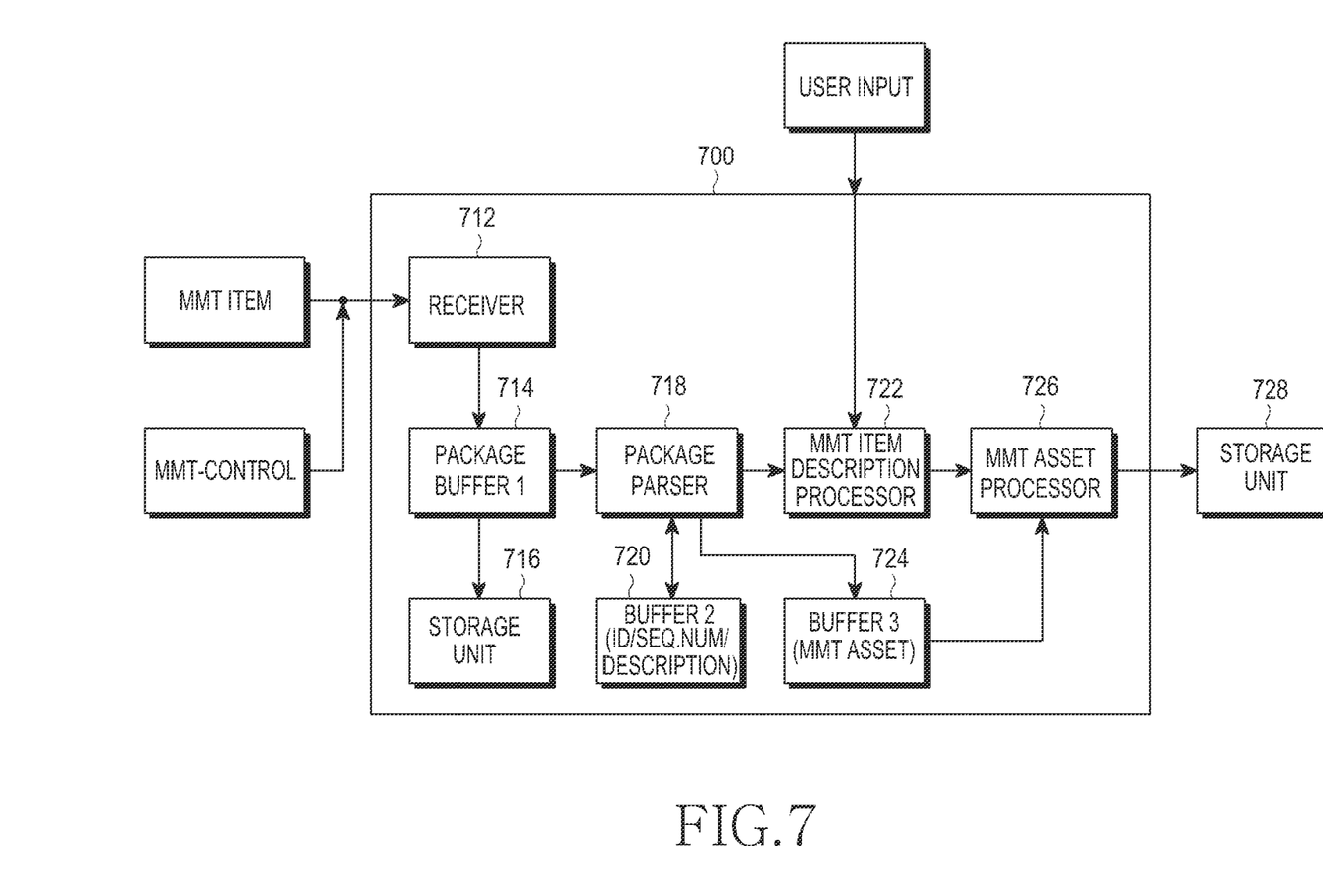
FIG. 7 is a block diagram illustrating a reproduction device according to an embodiment of the present disclosure.

FIG. 7 is a block diagram of a reproduction device according to an embodiment of the present disclosure.

The reproduction device can know of the existence of the MMT item, and a method of transmitting the MMT item, a path, and the like. When a reproduction of the MMT item is instructed by the user or automatically, the reproduction device receives packages included in the MMT item and initiates the reproduction of the MMT.

In the package, transport requirements for each MMT asset required for properly executing the corresponding MMT asset are included in transport characteristics. The reproduction device selects a path which the reproduction device can support among a plurality of available paths provided by the service provider and downloads the MMT asset. When the path which is being downloaded is not available any more due to a change in a surrounding environment, the reproduction device changes a network device for seamless transport or reproduction.

When there are one or more available paths in transmitting one MMT asset, the reproduction device tries to periodically receive a part of the MMT asset from the available path within a range that does not damage total reproduction of the reproduction device and transmission performance. Since the MMT asset is divided into slices and the slice list is provided to the package, it is possible to make a request for transport of different slices for a plurality of paths and download the different slices.

Types of a reproduction device include a home server, a main display device, a sub display device and the like. After the reproduction device receives composition packages of the MMT item from the service provider through the home server, a reproduction device in which MMT assets can be properly reproduced is found and the corresponding reproduction device instructs to reproduce the MMT asset.

Accordingly, the home server of the reproduction device refers to MMT item composition information. The target_characteristic includes what device capabilities are required and where, in terms of space and time, the MMT assets must be displayed. That is, it cannot be helped when a value corresponding to a corresponding property cannot be supported by the reproduction device connected to the home server, but an attempt is made to reproduce the corresponding MMT asset in a reproduction device that satisfies target_characteristic among a plurality of reproduction devices connected to the home server if possible.

Referring to FIG. 7, the reproduction device 700 can know of the existence of the MMT item and a path on a network of the package included in the MMT item through the MMT-control.

A receiver 712 refers to any device capable of receiving information from the outside as well as a wired/wireless network, through which the package is transmitted. The package may be primarily stored in a buffer #1 714 to be processed, and temporarily or semi-permanently stored in a storage device 716 within the reproduction device as necessary. The package is delivered to a package parser 718 for analysis, and header information of the package is stored in a buffer #2 720 and used for successive packages such as a live broadcast. An MMT item description of the package header is processed by a separate processor which is a main processor to present the MMT item to the user. Since the MMT item displays the MMT asset on the time/space axis, the MMT asset stored in a buffer #3 724 is transmitted to an MMT asset processor 726 at a proper time, delivered to a display device 728, and finally consumed by the user. When the user issues a command for trick play such as fast-forward during the reproduction or reproduction after 30 seconds, the command is delivered to the MMT item description processor 722. Then, a position of the time axis corresponding to a requested time and MMT assets which should be displayed are determined, and the corresponding MMT asset is processed by the processor.

Figure 8A:
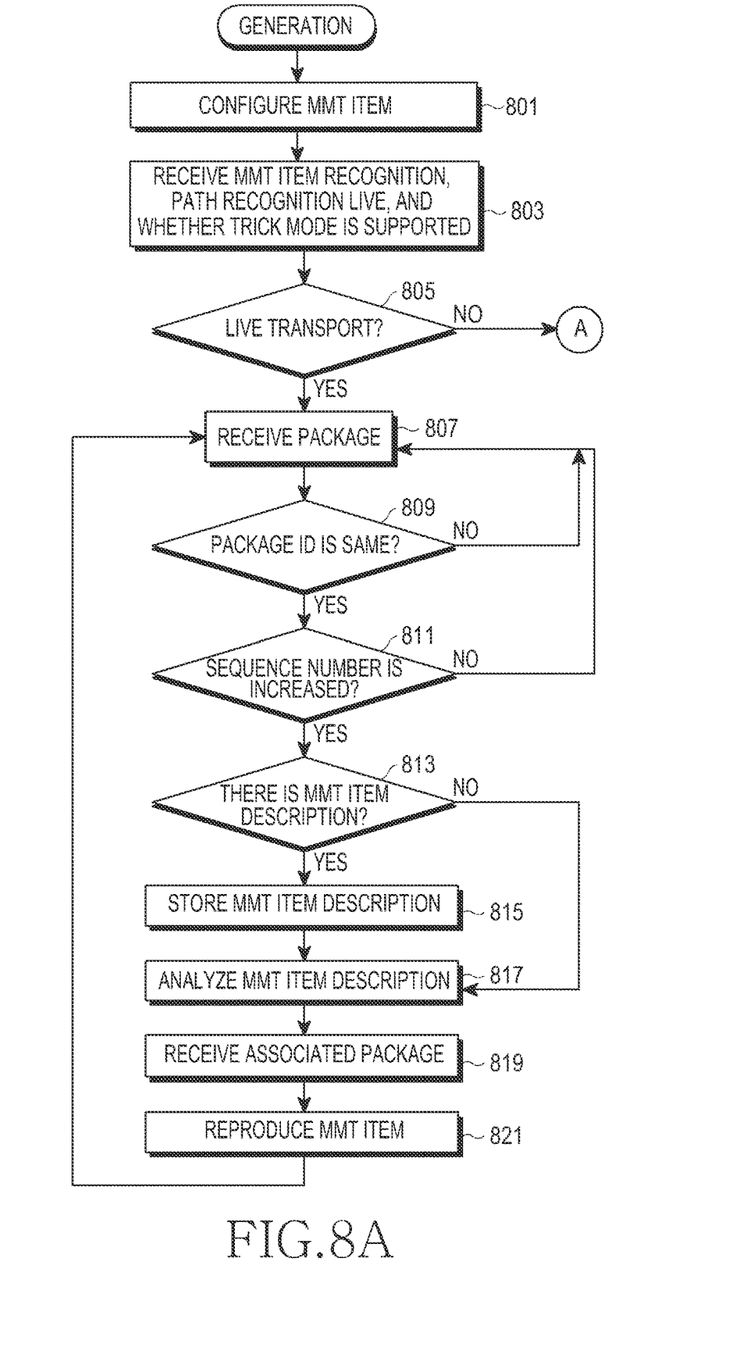
FIGS. 8A and 8B are flowcharts illustrating an operation of a reproduction device according to an embodiment of the present disclosure.
Figure 8B:
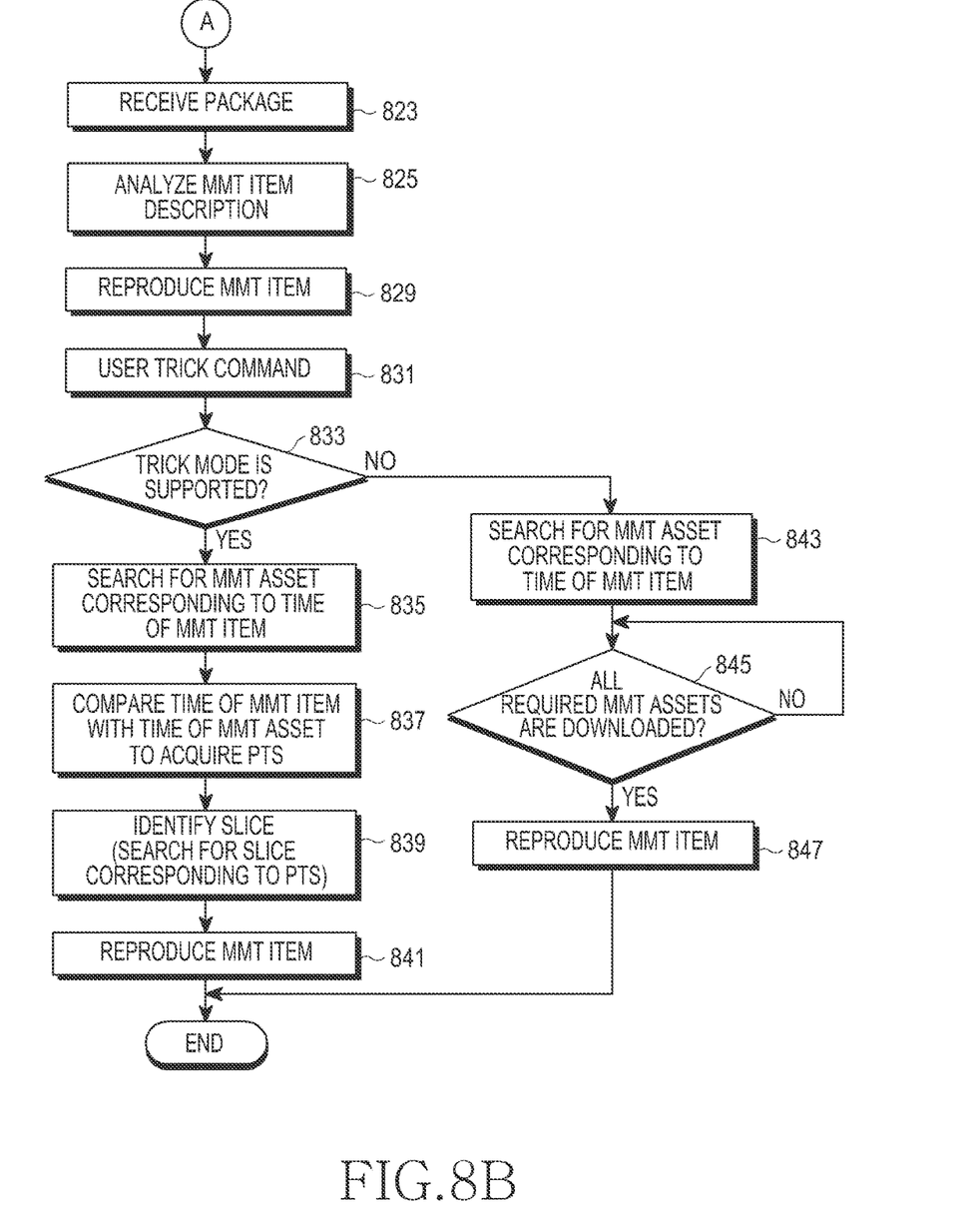

FIGS. 8A and 8B are flowcharts illustrating an operation of a reproduction device according to an embodiment of the present disclosure.

The operation in FIGS. 8A and 8B may be performed by the reproduction device of FIG. 7. However, the reproduction device is not limited to the reproduction device of FIG. 7.

Referring to FIGS. 8A and 8B, the reproduction device reproduces the MMT item at operation 801 and receives information including MMT item recognition, path recognition, live, and information on whether the trick mode is supported at operation 803. The reproduction device determines if the transport is live transport through the received information at operation 805. When the transport is the live transport, the reproduction device receives the package at operation 807 and determines if the package ID is the same at operation 809. When the package ID is the same, the reproduction device determines whether the sequence number increases at operation 811. When the sequence number increases, the reproduction device determines whether there is an MMT item description at operation 813. When there is the MMT item description, the reproduction device stores the MMT item description in a buffer at operation 815 and interprets the MMT item description at operation 817. Thereafter, the reproduction device receives an associated package at operation 819 and reproduces the MMT item at operation 821. The reproduction device returns to operation 807.

When it is determined that the package is not the same at operation 809 and when it is determined that the sequence number does not increase at operation 811, the reproduction device returns to operation 807. Further, when it is determined that there is the MMT item description at operation 813, the reproduction device proceeds to operation 817.

Meanwhile, when it is determined that the transport is not the live transport at operation 805, the reproduction device receives another package associated with the package as well as the package at operation 823 and analyzes lists of MMT composition information at operation 825. Thereafter, the reproduction device reproduces the MMT item at operation 829. Thereafter, the reproduction device receives a user trick command at operation 831 and determines if a trick mode is supported at operation 833. When the trick mode is supported, the reproduction device searches for the MMT asset corresponding to the time on the MMT item at operation 835. As a result of the search, the reproduction device compares the time on the MMT item with an MMT asset time to acquire a PTS at operation 837.

Further, the reproduction device identifies the slice and searches for the slice corresponding to the PTS at operation 839. The reproduction device reproduces the MMT item at operation 841.

Meanwhile, when it is determined that the trick mode is not supported at operation 833, the reproduction device searches for the MMT asset corresponding to the time on the MMT item at operation 843. The reproduction device determines whether all the required MMT assets are downloaded at operation 845. When all the required MMT assets are downloaded, the reproduction device reproduces the MMT item at operation 847.

According to the present disclosure, the service provider configures the service by using a plurality of contents and transmits the configured service by using one or a plurality of paths on heterogeneous networks.

According to the present disclosure, it is possible to consume an efficient service by using a plurality of contents in a convergence environment.

While the present disclosure has been shown and described with reference to various embodiments thereof, it will be understood by those skilled in the art that various changes in form and details may be made therein without departing from the spirit and scope of the present disclosure as defined by the appended claims and the equivalents.

The invention claimed is:

1. A method of transmitting media data, the method comprising:
   identifying a package including a plurality of assets, transport characteristics of each asset of the plurality of assets, and composition information on the plurality of assets; and
   transmitting the package,
   wherein the composition information includes information on spatial and temporal relationships among the plurality of assets,
   wherein the information on spatial and temporal relationships comprises synchronization information for synchronizing the plurality of assets in the package, and target characteristic information required to at least one device for presenting each of the plurality of assets,
   wherein the target characteristic information includes information for indicating whether the plurality of assets in the package are required to be presented across two or more screens, the plurality of assets being different from each other, and information indicating whether the plurality of assets in the package require a user interactive input, and
   wherein the transport characteristics include quality of service (QoS) information and delivery direction information of the plurality of assets.

2. The method of claim 1, wherein the package includes a detailed description of the plurality of assets and a fragment list of the plurality of assets.

3. The method of claim 1, wherein, when the plurality of assets are arranged in a plurality of devices including the at least one device, the composition information includes information on which of the plurality of assets is arranged in which device among the plurality of devices.

4. The method of claim 1, wherein the composition information includes at least one of service composition information of another package, asset information with the same or a different package, or a component within an asset within the same or the different package.

5. The method of claim 1, wherein the package is distinguished by a package ID in a general broadcast and distinguished by the package ID and a sequence number in a live broadcast.

6. The method of claim 1, wherein one asset is stored as one fragment in a general mode and stored as a plurality of fragments in a trick mode, and a time on a time axis of the plurality of fragments is indicated by a presentation time stamp (pts).

7. The method of claim 1, wherein the package includes a list of the plurality of assets.

8. The method of claim 1, wherein the composition information includes information indicating whether a decoding of an asset in the package is dependent to a decoding of another asset in the package.

9. An apparatus for transmitting media data, the apparatus comprising:
   a package generator configured to identify a package including a plurality of assets, transport characteristics of each asset of the plurality of assets, and composition information on the plurality of assets; and
   a transport unit configured to transmit the package,
   wherein the composition information includes information on spatial and temporal relationships among the plurality of assets,
   wherein the information on spatial and temporal relationships comprises synchronization information for synchronizing the plurality of assets in the package, and target characteristic information required to at least one device for presenting each of the plurality of assets,
   wherein the target characteristic information includes information for indicating whether the plurality of assets in the package are required to be presented across two or more screens, the plurality of assets being different from each other, and information indicating whether the plurality of assets in the package require a user interactive input, and
   wherein the transport characteristics include quality of service (QoS) information and delivery direction information of the plurality of assets.

10. The apparatus of claim 9, wherein the package includes a detailed description of the plurality of assets and a fragment list of the plurality of assets.

11. The apparatus of claim 9, wherein, when the plurality of assets are arranged in a plurality of devices including the at least one device, the composition information includes information on which of the plurality of assets is arranged in which device among the plurality of devices.

12. The apparatus of claim 9, wherein the composition information includes at least one of service composition information of another package, asset information with the same or a different package, or a component within an asset within the same or the different package.

13. The apparatus of claim 9, wherein the package is distinguished by a package ID in a general broadcast and distinguished by the package ID and a sequence number in a live broadcast.

14. The apparatus of claim 9, wherein one asset is stored as one fragment in a general mode and stored as a plurality of fragments in a trick mode, and a time on a time axis of the plurality of fragments is indicated by a presentation time stamp (pts).

15. The apparatus of claim 9, wherein the package includes a list of the plurality of assets.

16. The apparatus of claim 9, wherein the composition information includes information indicating whether a decoding of an asset in the package is dependent to a decoding of another asset in the package.

17. A method of receiving media data, the method comprising:
receiving a package including a plurality of assets, transport characteristics of each asset of the plurality of assets, and composition information on the plurality of assets;
analyzing the package; and
processing the plurality of assets and composition information in the package according to a result of the analysis,
wherein the composition information includes information on spatial and temporal relationships among the plurality of assets,
wherein the information on spatial and temporal relationships comprises synchronization information for synchronizing the plurality of assets in the package, and target characteristic information required to at least one device for presenting each of the plurality of assets,
wherein the target characteristic information includes information for indicating whether the plurality of assets in the package are required to be presented across two or more screens, the plurality of assets being different from each other, and information indicating whether the plurality of assets in the package require a user interactive input, and
wherein the transport characteristics include quality of service (QoS) information and delivery direction information of the plurality of assets.

18. The method of claim 17, wherein the package includes a detailed description of the plurality of assets and a fragment list of the plurality of assets.

19. The method of claim 17, wherein, when the plurality of assets are reproduced in a plurality of devices including the at least one device, the composition information includes information on which of the plurality of assets are reproduced in which device among the plurality of devices.

20. The method of claim 17, wherein the composition information includes at least one of service composition information on another package, asset information with the same or a different package, or a component within an asset within the same or the different package.

21. The method of claim 17, wherein the package is distinguished by a package ID in a general broadcast and distinguished by the package ID and a sequence number in a live broadcast.

22. The method of claim 17, wherein one asset is stored as one fragment in a general mode and stored as a plurality of fragments in a trick mode, and a time on a time axis of the plurality of fragments is indicated by a presentation time stamp (pts).

23. The method of claim 17, wherein the package includes a list of the plurality of assets.

24. The method of claim 17, wherein the composition information includes information indicating whether a decoding of an asset in the package is dependent to a decoding of another asset in the package.

25. An apparatus for receiving media data, the apparatus comprising:
a receiver configured to receive a plurality of assets, transport characteristics of each asset of the plurality of assets, and composition information on the plurality of assets;
a package parser configured to parse the package; and
a processor configured to process the plurality of assets and composition information included in the package according to a result of the analysis,
wherein the composition information includes information on spatial and temporal relationships among the plurality of assets,
wherein the information on spatial and temporal relationships comprises synchronization information for synchronizing the plurality of assets in the package, and target characteristic information required to at least one device for presenting each of the plurality of assets,
wherein the target characteristic information includes information for indicating whether the plurality of assets in the package are required to be presented across two or more screens, the plurality of assets being different from each other, and information indicating whether the plurality of assets in the package require a user interactive input, and
wherein the transport characteristics include quality of service (QoS) information and delivery direction information of the plurality of assets.

26. The apparatus of claim 25, wherein the package includes a detailed description of the plurality of assets and a fragment list of the plurality of assets.

27. The apparatus of claim 25, wherein, when the plurality of assets are reproduced in a plurality of devices including the at least one device, the composition information includes information on which of the plurality of assets are reproduced in which device among the plurality of devices.

28. The apparatus of claim 25, wherein the composition information includes at least one of service composition information on another package, asset information with the same or a different package, or a component within an asset within the same or the different package.

29. The apparatus of claim 25, wherein the package is distinguished by a package ID in a general broadcast and distinguished by the package ID and a sequence number in a live broadcast.

30. The apparatus of claim 25, wherein one asset is stored as one fragment in a general mode and stored as a plurality of fragments in a trick mode, and a time on a time axis of the plurality of fragments is indicated by a presentation time stamp (pts).

31. The apparatus of claim 25, wherein the package includes a list of the plurality of assets.

32. The apparatus of claim 25, wherein the composition information includes information indicating whether a decoding of an asset in the package is dependent to a decoding of another asset in the package.

* * * * *